US007275313B2

(12) United States Patent
Ichida et al.

(10) Patent No.: US 7,275,313 B2
(45) Date of Patent: Oct. 2, 2007

(54) UNLOCKING JIG

(75) Inventors: Kiyofumi Ichida, Yokkaichi (JP); Nobuyoshi Tanaka, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 432 days.

(21) Appl. No.: 10/747,414

(22) Filed: Dec. 29, 2003

(65) Prior Publication Data

US 2005/0048837 A1 Mar. 3, 2005

(30) Foreign Application Priority Data

Jan. 9, 2003 (JP) ............................ 2003-003164

(51) Int. Cl.
*B23P 19/00* (2006.01)

(52) U.S. Cl. ............................ 29/747; 29/748; 29/750; 29/754; 439/67; 439/495

(58) Field of Classification Search .................. 29/729, 29/739, 745–748, 750, 751, 758, 874, 876; 439/752, 744
See application file for complete search history.

(56) References Cited

U.S. PATENT DOCUMENTS 3,885,287 A * 5/1975 Long et al. ................... 29/705
4,155,159 A * 5/1979 Hogan et al. ................. 29/764
5,401,186 A * 3/1995 Nozaki et al. .............. 439/495
5,473,816 A * 12/1995 Harden et al. ................ 29/876
5,528,821 A * 6/1996 Matsuzawa .................. 29/705
5,984,705 A * 11/1999 Miyazaki et al. ........... 439/304
6,249,960 B1 * 6/2001 Faesel ......................... 29/762
6,250,962 B1 6/2001 Shinozaki
6,419,522 B1 * 7/2002 Bonilla ....................... 439/595
6,634,096 B1 * 10/2003 Yamamoto et al. ........... 29/764
6,904,670 B2 * 6/2005 Kawamura et al. ........... 29/748
7,201,615 B2 * 4/2007 Kojima ....................... 439/752

* cited by examiner

*Primary Examiner*—Minh Trinh
(74) *Attorney, Agent, or Firm*—Gerald E. Hespos; Anthony J. Casella

(57) ABSTRACT

An unlocking jig (40) is fit on a female housing (10) from below. As a result, a guide groove (43A) on a bottom portion (43) of the unlocking jig (40) engages a convexity (22C) on a lower surface of the female housing (10) and a guide groove (43B) on an arm (45) engages a convexity (22B) on a side surface of the female housing (10). The unlocking jig (40) has unlocking claws (a1, a2) that engage short locking pieces (38B, 38C) when the unlocking jig (40) is moved and unlock the short locking pieces (38B, 38C) from locks (22B, 22C) on the housing (10).

9 Claims, 10 Drawing Sheets

UNLOCKING JIG

BACKGROUND OF THE INVENTION

1. Field of the Invention

The invention relates to an unlocking jig for unlocking a plurality of flexing pieces from locking projections that prevent separation between a housing and a member mounted on the housing.

2. Description of the Related Art

U.S. Pat. No. 6,250,962 and FIG. 10 herein disclose a waterproof connector. With reference to FIG. 10, the waterproof connector includes a female housing 1 with opposite front and rear ends, and receives female terminal fittings 2 that are mounted to ends of electric wires 3. A waterproof rubber seal 4 is mounted on the rear side of a female housing 1 for waterproofing the electric wires 3 and is held in place by a hold-down member 5 that is installed on the female housing 1. More particularly, locking projections 6*a* and 6*b* are formed on the side surfaces at the rear of the female housing 1 and flexing pieces 7*a* and 7*b* project from the hold-down member 5 at locations aligned with the locking projections 6*a* and 6*b*. The hold-down member 5 is pressed against the female housing 1 so that the flexing pieces 7*a* and 7*b* elastically deform and ride over the locking projections 6*a* and 6*b*. The flexing pieces 7*a* and 7*b* then return resiliently to lock the locking projections 6*a* and 6*b*. In this manner, the waterproof rubber seal 4 is sandwiched between the hold-down member 5 and the female housing 1.

The flexing pieces 7*a* and 7*b* must be unlocked from the locking projections 6*a* and 6*b* to remove the hold-down member 5 from the female housing 1. In the conventional method, a flat blade screwdriver is inserted between the side surface of the female housing 1 and the inner side of the flexing pieces 7*a* and 7*b* to unlock the flexing pieces 7*a* and 7*b* from the locking projections 6*a* and 6*b*. In this method, the flexing pieces 7*a* and 7*b* are unlocked one by one. However, one of the unlocked flexing pieces 7*a* or 7*b* may be locked again while the other flexing piece is being unlocked. Therefore the conventional method is inconvenient.

The invention has been made in view of the above-described problem. Accordingly, it is an object of the invention to provide an unlocking jig capable of unlocking a plurality of flexing pieces from locking projections easily and efficiently.

SUMMARY OF THE INVENTION

The invention relates to an unlocking jig for removing a member that has been mounted securely on a housing. The member or the housing has a plurality of flexing pieces that are locked elastically to a plurality of locks on the other of the member or the housing. The unlocking jig functions by unlocking the flexing pieces. The unlocking jig includes an operation part and an unlocking part disposed at an end of the operation part. Unlocking claws are formed on the unlocking part and are configured to deform the flexing pieces simultaneously in an unlocking direction.

The unlocking part has a contact portion that contacts part of the member when the unlocking claws have deformed the flexing pieces. The unlocking part then is capable of pressing the member from the housing in a member-removal direction merely by moving the operation part.

The unlocking part preferably has a to-be-guided portion that fits on a guide on an outer side surface of the housing. Thus, the operation part can be operated to guide the unlocking jig in a member-removal direction.

The unlocking jig is moved so that the unlocking claws engage the corresponding flexing pieces. Thus, the flexing pieces deform simultaneously in the directions for unlocking the flexing pieces from the corresponding locks. Thus the member can be removed from the housing.

The unlocking jig allows the flexing pieces to be unlocked simultaneously from the corresponding locks. Therefore, the removing operation is performed easily and efficiently, unlike the conventional art.

The unlocking jig is moved in the direction in which the member separates from the housing. Thus, the contact surface of the unlocking jig presses the member while the flexing pieces are deformed in the unlocking direction and hence the member is removed from the housing merely by operating the unlocking jig.

The guide and the to-be-guided portion engage while operating the operation part to remove the member from the housing. Therefore it is possible to operate the operation part smoothly.

DETAILED DESCRIPTION OF THE PREFERRED EMBODIMENTS

Figure 1:
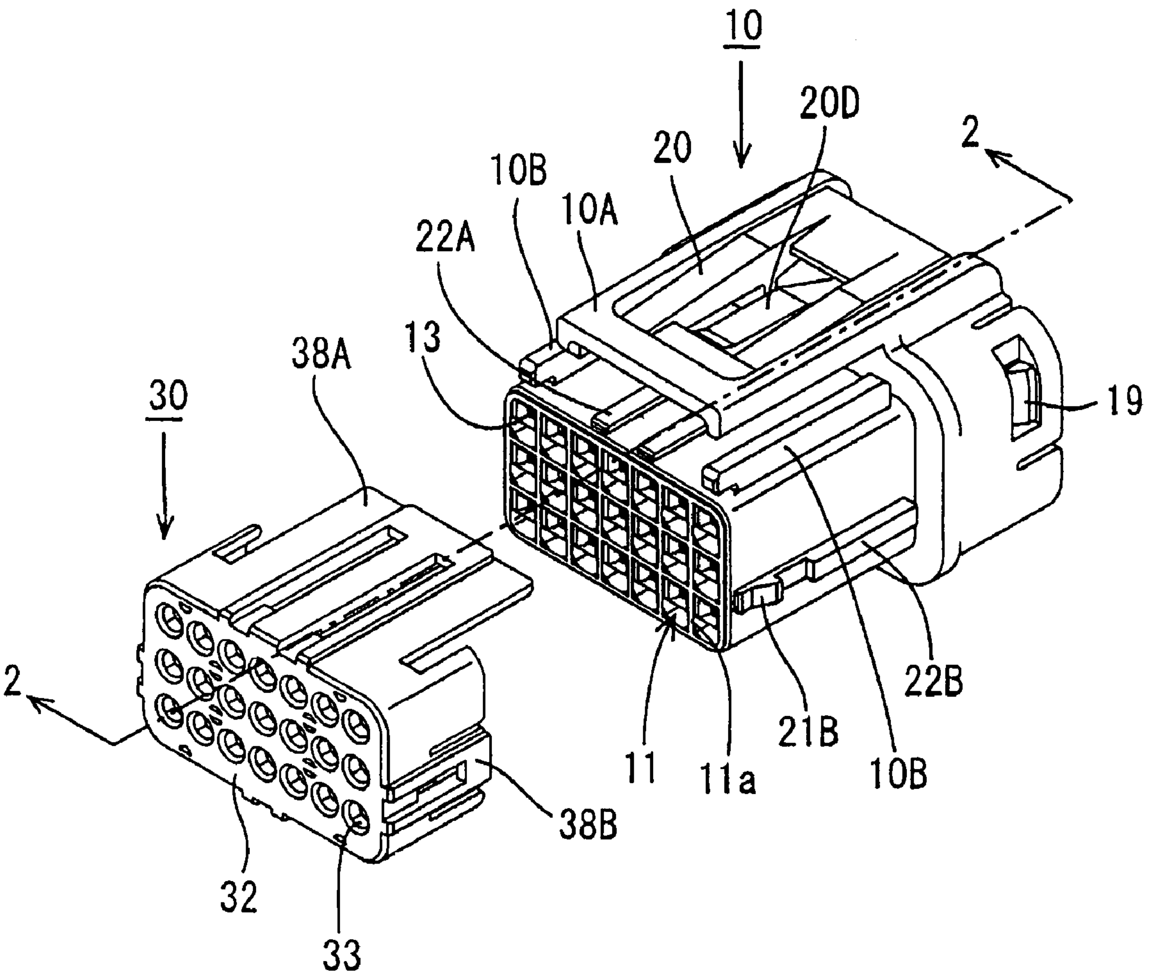
FIG. 1 is a perspective view showing a female housing and a holder not mounted on the female housing according to a first embodiment of the present invention.
Figure 2:
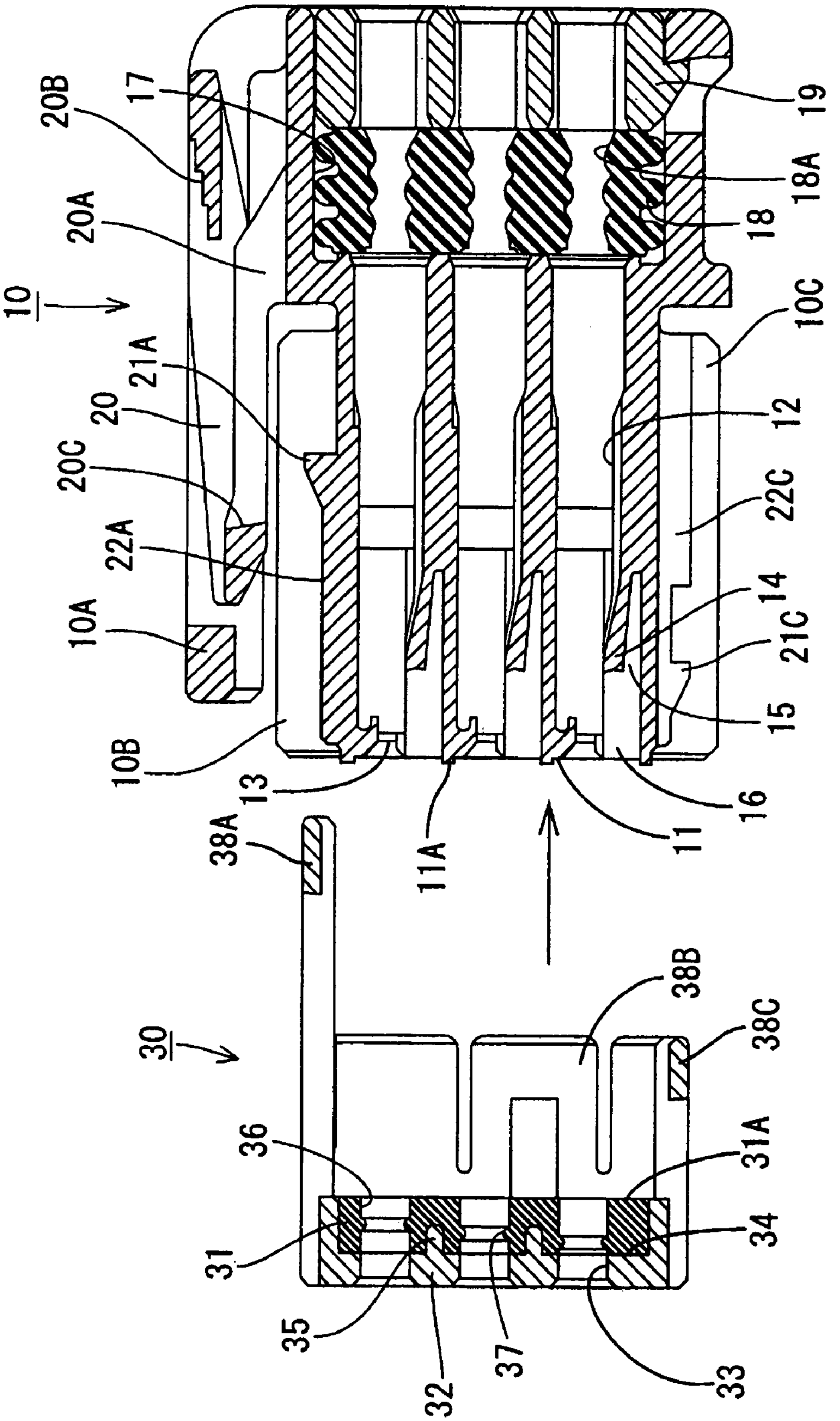
FIG. 2 is a sectional view, showing the holder and the female housing, taken along a line 2-2.

A waterproof connector includes a female housing identified by the numeral 10 in FIGS. 1 and 2. The female housing 10 is made of a synthetic resin and has a front end 11 and an opposite rear end. Portions of the female housing 10 adjacent the front end 11 are substantially block-shaped so that the female housing 10 can be fit in a hood of a male housing (not shown).

Cavities 12 extend through the female housing 10 in a front-to-back direction, as shown in FIGS. 1 and 2. The cavities 12 are arranged in seven rows and three stages that correspond to positions of male terminal fittings of the male housing. A terminal fitting insertion opening 13 extends into the front of each cavity 12 for receiving the male terminal fitting, and a lance 14 is formed on a bottom wall of each cavity 12. The lance 14 is elastically deformable toward a flexing space 15 disposed at a lower portion of the cavity 12. An insertion opening 16 extends into the front of the flexing space 15 and receives a jig for unlocking the male terminal fitting from the lance 14.

A rubber plug accommodation portion 17 is formed in the rear of the female housing 10 and communicates with all of the cavities 12. A rubber plug 18 is fit in the rubber plug accommodation portion 17 and has through-holes 18A that align respectively with the cavities 12. A rubber plug hold-down member 19 holds the rubber plug 18 in the rubber plug accommodation portion 17.

Female terminal fittings (not shown) are fixed to ends of electric wires and are inserted into the cavities 12 from the rear so that the female terminal fittings penetrate through the through-holes 18A of the rubber plug 18. The lances 14 lock the female terminal fittings when each female terminal fitting reaches a predetermined position. At this time, portions of the rubber plug 18 that define the through-holes 18A attach closely to the periphery of each electric wire. Thus, the entrance of each cavity 12 is sealed from water.

A locking arm 20 is formed on an upper surface of the female housing 10 for locking the male housing and keeping the male housing and the female housing 10 fit together. The locking arm 20 is a rectangular frame formed and has two supports 20A disposed at right and left portions near the rear of the locking arm 20. Thus, the locking arm 20 can pivot on the supports 20A like a seesaw. An unlocking portion 20B is formed at the rear end of the locking arm 20 and has a stepped slip preventing upper surface. A locking edge 20C is formed at an open front end of the rectangular frame of the locking arm 20 and can be locked to a locking projection (not shown) of the male housing when both housings have fit together at a predetermined position. A reinforcing piece 20D connects the rear end of the upper surface of the female housing 10 and the widthwise center of the locking edge 20C to reinforce the flexing rigidity of the locking arm 20. The reinforcing piece 20D partitions an open portion disposed inside the rectangular frame of the locking arm 20 into right and left portions. A pointed jig (not shown) can be inserted into the open portion.

A protection frame 10A is cantilevered forward from the rear end of the upper surface of the female housing 10 and surrounds the locking arm 20. The lower surface of the protection frame 10A is almost flush with the lower surface of the locking arm 20. Two guide ribs 10B are formed on the upper surface of the female housing 10 rearward from the front end of the upper surface thereof. Two convexities 22A are formed on the upper surface of the female housing 10 at locations symmetrical about the widthwise center of the female housing 10 and extend along the direction in which the male housing and the female housing 10 fit together. A locking projection 21A is formed on the rear end of each of the convexities 22A.

Convexities 22B and 22C similar to the convexities 22A are formed along the fit-on direction on both side surfaces of the female housing 10 and the lower surface thereof respectively. Unlike the convexity 22A formed on the upper surface of the female housing 10, front portions of the convexities 22B and 22C are cut out to form locking projections 21B and 21C respectively. More specifically, the convexity 22B on the side surface of the female housing 10 is disposed at a level lower than the vertical center line of the side surface thereof. The convexity 22C on the lower surface of the female housing 10 is at the widthwise center of the lower surface. Two guide ribs 10C are formed on the lower surface of the female housing 10 and extend in the direction in which in which the male housing and the female housing 10 fit together. The convexity 22C is between the two guide ribs 10C. The widthwise position of the guide rib 10C on the lower surface of the female housing 10 is different from the widthwise position of the guide rib 10B on the upper surface thereof to prevent the female housing 10 from being fit upside down in the male housing.

The connector further includes a generally cap-shaped holder 30 that is configured to hold a waterproof seal 31 therein and to position the waterproof seal 31 on the front end 11 of the female housing 10. Like the female housing 10, the holder 30 is made of a hard resin, such as PBT (polybutylene terephthalate), and includes a front plate 32 with a plurality of circular window openings 33 disposed to correspond to the terminal fitting insertion opening 13 of each cavity 12. The base of the male terminal fitting of the male housing can be inserted into the window opening 33. The edge of the window opening 33 at the front side is tapered to guide the male terminal fitting therein.

A mounting concavity 34 is defined on the rear side of the front plate 32 and is configured to receive the waterproof seal 31. Thus, the waterproof seal 31 is mounted in the concavity 34 of the holder 30 and then the holder 30 is mounted on the female housing 10. The holder 30 is configured to cover the entire front end 11 of the female housing 10. A rib 11A projects forward from the front end 11 in such a way as to connect the periphery of the front end 11 and the lower edges of the cavities 12 of each stage of cavities 12 to each other.

The holder 30 has a flexible long locking piece 38A on the edge of the upper surface, flexible short side locking pieces 38B on both side surfaces and a flexible lower locking piece 38C on the lower surfaces thereof. The long locking piece 38A, the short side locking pieces 38B, and the short lower locking piece 38C are referred to generally as flexing pieces. The flexing pieces 38A-38C of the holder 30 project back from the rear side of the front plate 32 and surround the mounting concavity 34 that receives the waterproof seal 31.

The waterproof seal 31 is a thick plate-shaped member formed unitarily from a soft resin (rubber), such as silicone rubber, and is inserted into the mounting concavity 34. In the state in which the holder 30 has been mounted on the female housing 10, the rib 11A on the front end 11 of the female housing 10 cuts into the waterproof seal 31. Thus, all of the cavities 12 are sealed from water.

The seal 31 has circular through-holes 36 formed at positions coincident with the window openings 33 in the front plate 32 of the holder 30. A lip 37 is formed on the inner peripheral surface of each through-hole 36. The inner diameter of the lip 37 is slightly smaller than the outer dimension of the base of the male terminal fitting of the male housing. The position of the lip 37 at the uppermost step is disposed rearward (right-hand side in FIG. 1) from that of the lip 37 formed at the center step. Similarly, the position of the lip 37 formed at the center step is disposed rearward from that of the lip 37 formed at the lowermost step.

The holder 30 is put on the front end of the female housing 10 in the direction shown by the arrow of FIG. 2. Thus, the guide ribs 10B slidably contact the side edges of a long locking piece 38A of the holder 30 to guide the holder 30 onto the female housing 20. The rear end (front end in moving direction) of each of the locking pieces 38A through 38C rides across the locking projections 21A through 21C respectively, and, as a result, the rear ends of the locking pieces 38A through 38C deform elastically outward. When the rear end of each of the locking pieces 38A through 38C passes the locking projections 21A through 21C respectively, the rear end of each of the locking pieces 38A through 38C returns to the original state, and the locking projections 21A through 21C are locked to the inner side of the frame-shaped locking pieces 38A through 38C respectively. Thus, the entire holder 30 is mounted securely on the female housing 10. In the state in which the holder 30 has been mounted on the female housing 10, a contact surface 31A of the seal 31 is pressed against the front end 11 of the female housing 10, with the ribs 11A pressing into the seal 31. Thus, all the cavities 12 are sealed from water.

Figure 3:
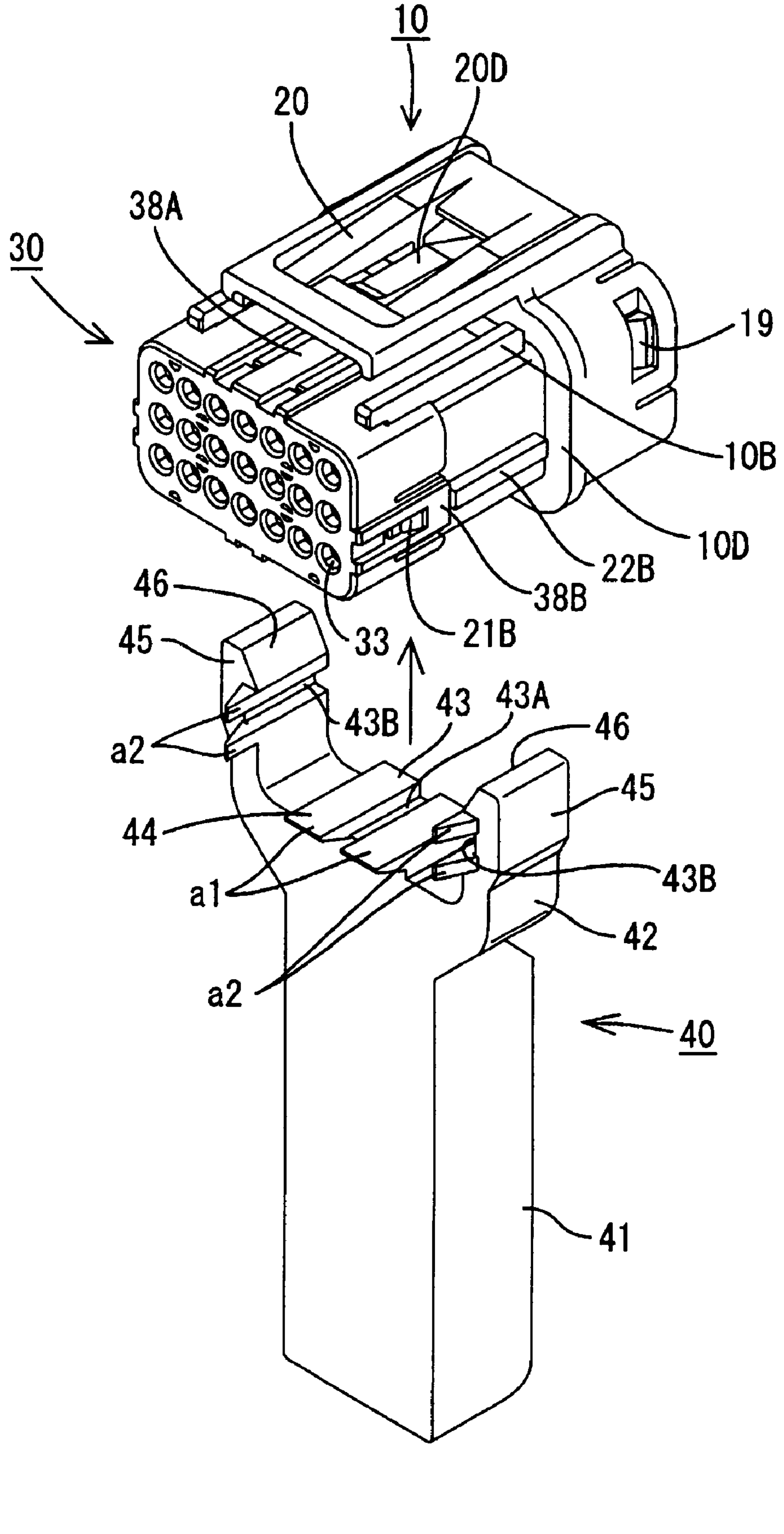
FIG. 3 is a perspective view (before holder is mounted on female housing) showing the female housing and the holder mounted on the female housing and an unlocking jig before the unlocking jig is applied to the female housing.
Figure 4:
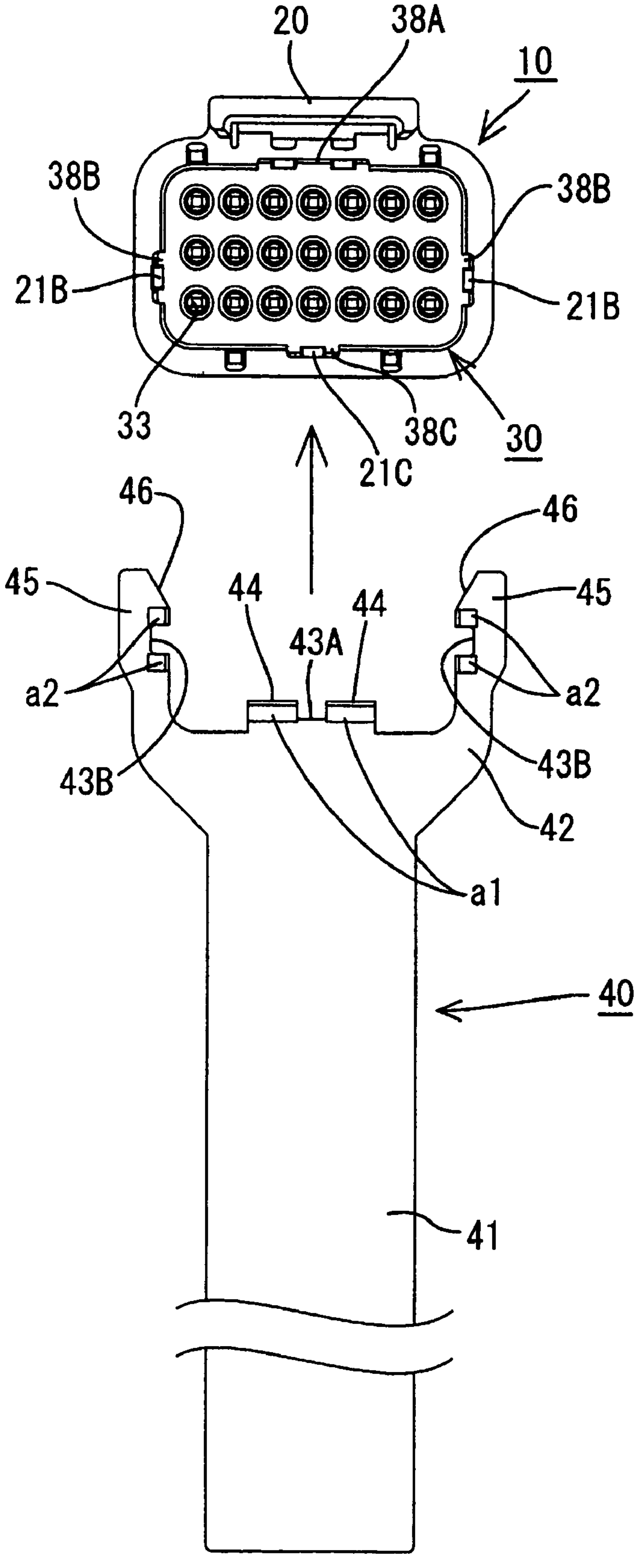
FIG. 4 is a front view showing the female housing, the holder, and the unlocking jig before the unlocking jig is applied to the female housing.
Figure 5:
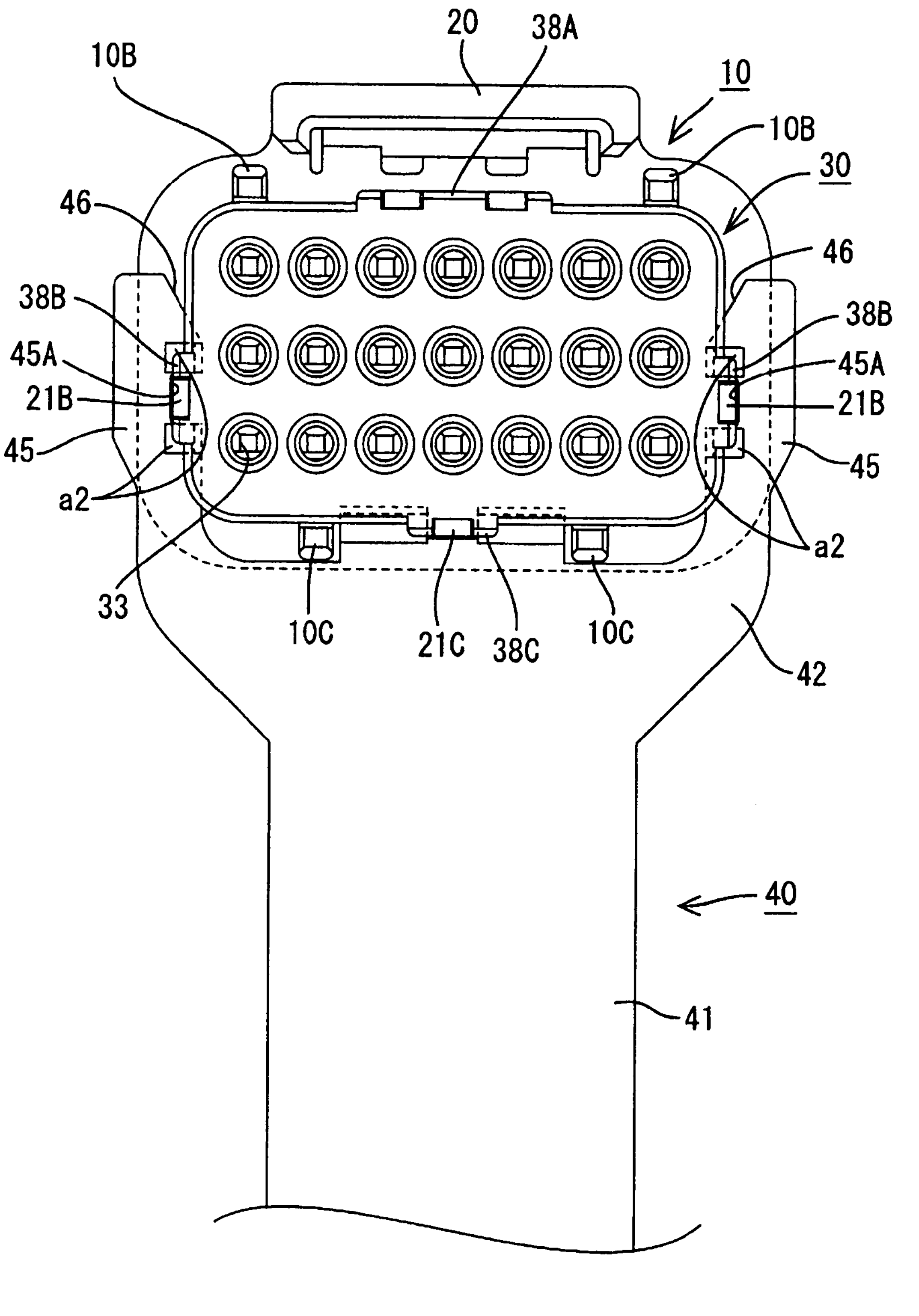
FIG. 5 is a front view showing the female housing, the holder, and the unlocking jig after the unlocking jig is applied to the female housing.
Figure 6:
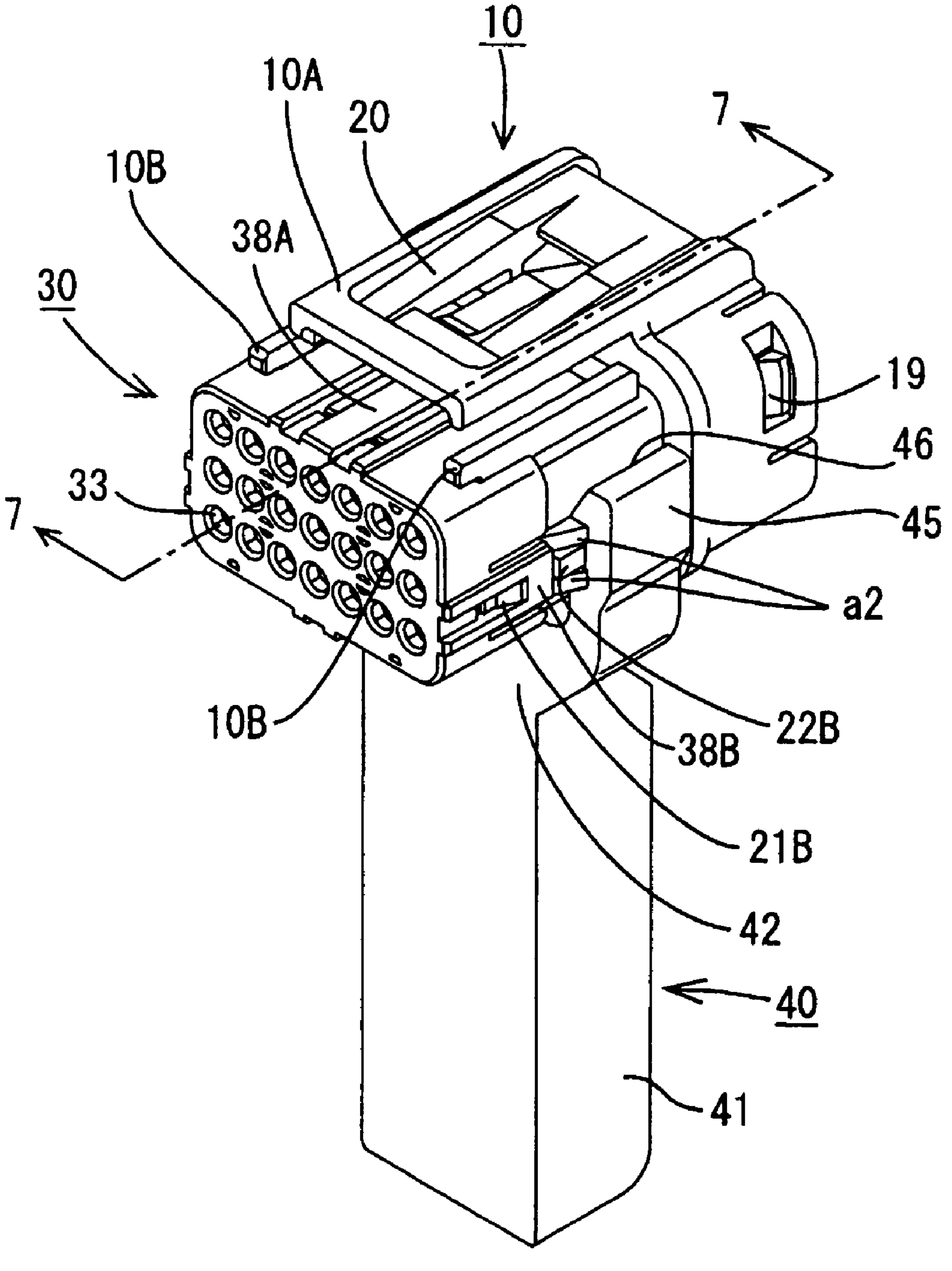
FIG. 6 is a perspective view showing the female housing, the holder, and the unlocking jig before the unlocking jig is applied to the female housing.
Figure 7A:
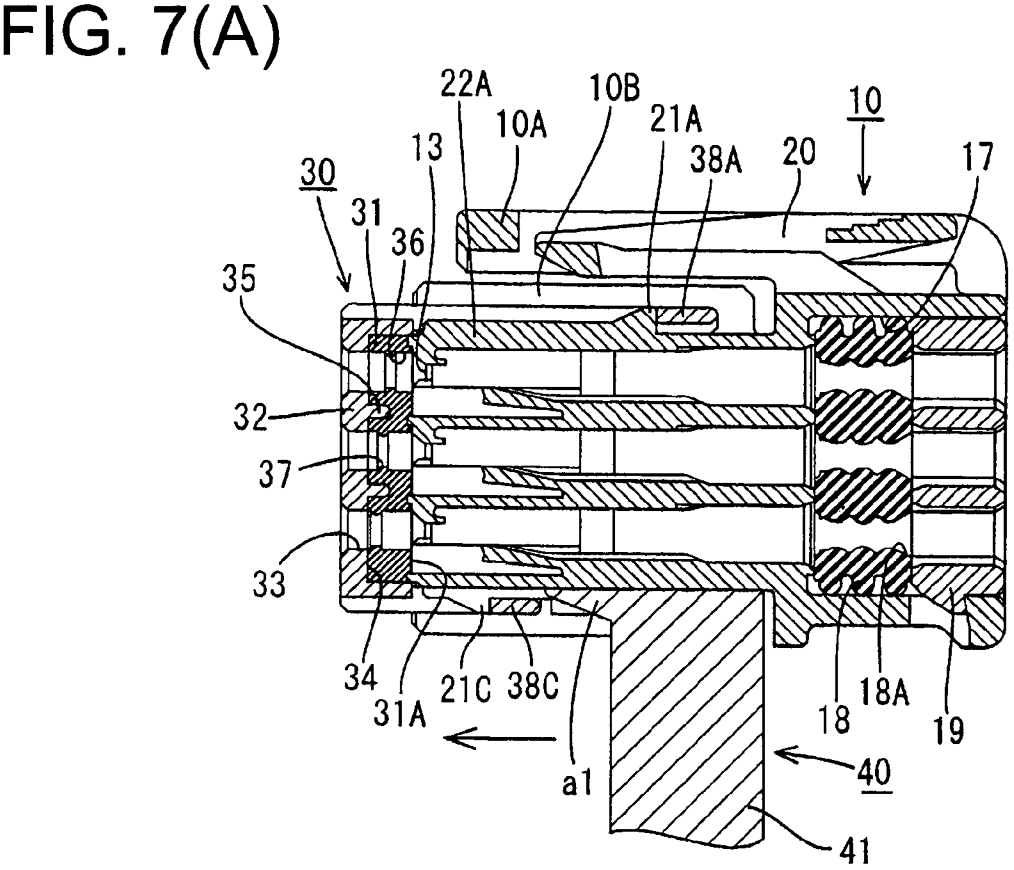
FIG. 7 is a sectional view, taken along a line 7-7, showing the female housing, the holder, and the unlocking jig before and after the unlocking jig is applied to the female housing.
Figure 7B:
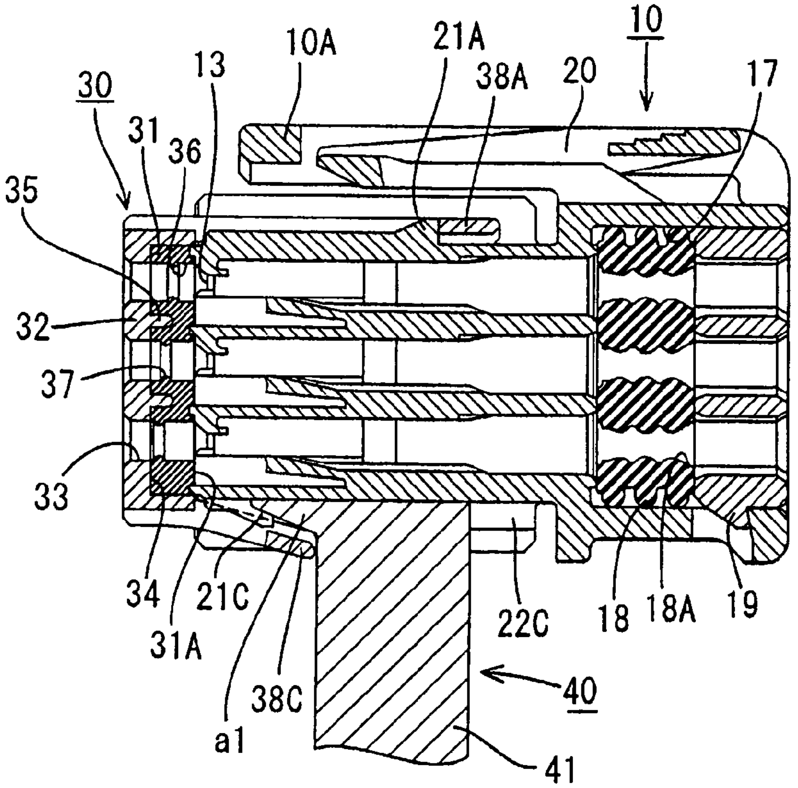
Figure 8A:
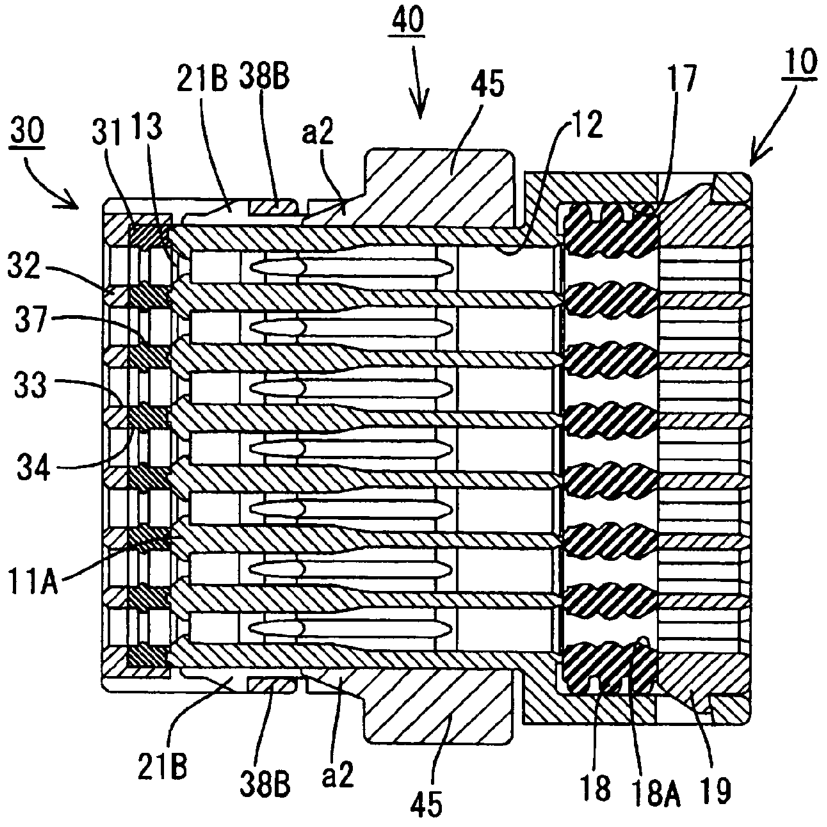
FIG. 8 is a plan sectional view showing the female housing, the holder, and the unlocking jig before and after the unlocking jig is applied to the female housing.
Figure 8B:
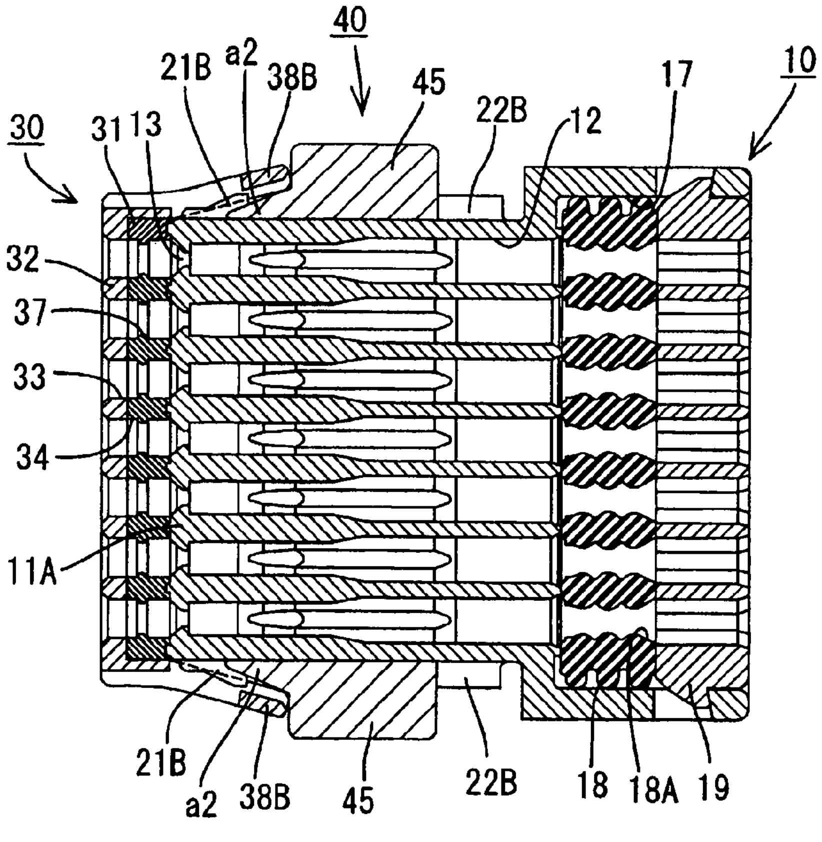

FIG. 3 shows an unlocking jig 40 for removing the holder 30 from the female housing 10. The unlocking jig 40 is molded unitarily from a synthetic resin and has a square pillar-shaped operation part 41 or handle to be gripped by an operator. An unlocking part 42 is disposed at the upper end of the operation part 41 for unlocking the short locking pieces 38B and 38C substantially simultaneously.

The unlocking part 42 is U-shaped and configured to nest over the rear portion of the female housing 10. Two projections 44 extend in a front-to-back direction on a base 43 of the unlocking part 42, and are disposed to confront the lower surface of the female housing 10. A guide groove 43A is formed between the projections 44. The guide groove 43A is disposed and configured to fit on the convexity 22C. The outer side surfaces of the projections 44 fit between the guide ribs 10C of the female housing 10 when the convexity 22C has fit in the guide groove 43A to guide an operation of moving the unlocking jig 40.

The front side of each projected piece 44 projects forward from the front end of the base 43 to form a wedge-shaped unlocking claw a1. The lower surface of the unlocking claw a1 is tapered forward to allow the unlocking claw a1 to enter into the short locking piece 38C locked to the locking projection 21C. Two arms 45 extend up on both sides of the unlocking part 42 and are flexible to some extent in an expansion direction. A tapered surface 46 is formed at an upper portion of the inner surface of each arm 45 for allowing the unlocking jig 40 to ride across both convexities 22B of the female housing 10. A guide groove 43B is formed at a central portion of the inner surface of each arm 45 and extends in the front-to-back direction. The convexity 22B is capable of fitting in the guide groove 43B. Two wedge-shaped unlocking claws a2 project forward from the front end of each arm 45 and the guide groove 43B is interposed between the unlocking claws a2. The outer surface of the unlocking claw a2 is tapered forward to allow the unlocking claw a2 to enter into the short locking piece 38B locked to the locking projection 21B.

The lengths of the unlocking claws a1 and a2 from the front end of the arm 45 are equal. The length between the front end of each of the unlocking claws a1 and a2 and the rear end of each arm 45 is slightly shorter than the length between a step 10D (see FIG. 3) of the female housing 10 and the front end of the holder 30 so that the unlocking jig 40 can be mounted on the female housing 10.

An operator can remove the holder 30 from the female housing 10 by gripping the operation part 41 and fitting the unlocking jig 40 on the female housing 10 from below. At this time, the tapered surfaces 46 at the upper ends of the arms 45 of the unlocking jig 40 contact the convexities 22B of the female housing 10. The unlocking part 42 then is pressed strongly against the female housing 10. As a result, both arms 45 deform outward and ride over the convexities 22B. The arms 45 ride across the convexity 22B and then return to their original state. Consequently the convexity 22C fits in the guide groove 43A, and the convexity 22B fits in the guide groove 43B. At this time, the front ends of the unlocking claws a1 and a2 are rearward from the rear ends of the short locking pieces 38C and 38B respectively.

The operation part 41 then is operated to move the entire unlocking jig 40 toward the holder 30. The moving operation can be accomplished smoothly because the convexity 22C is fit in the guide groove 43A, the convexity 22B is fit in the guide groove 43B, and the projected piece 44 slides in contact with the guide rib 10C. The moving operation causes the unlocking claws a1 and a2 to enter into the short locking pieces 38C and 38B respectively. Each of the short locking pieces 38B and 38C deforms elastically outward and is unlocked from the locking projections 21B and 21C respectively as the unlocking claws a1 and a2 move deep into the short locking pieces 38C and 38B respectively. Accordingly, the holder 30 is unlocked at both side surfaces thereof and the lower surface at once.

Figure 9:
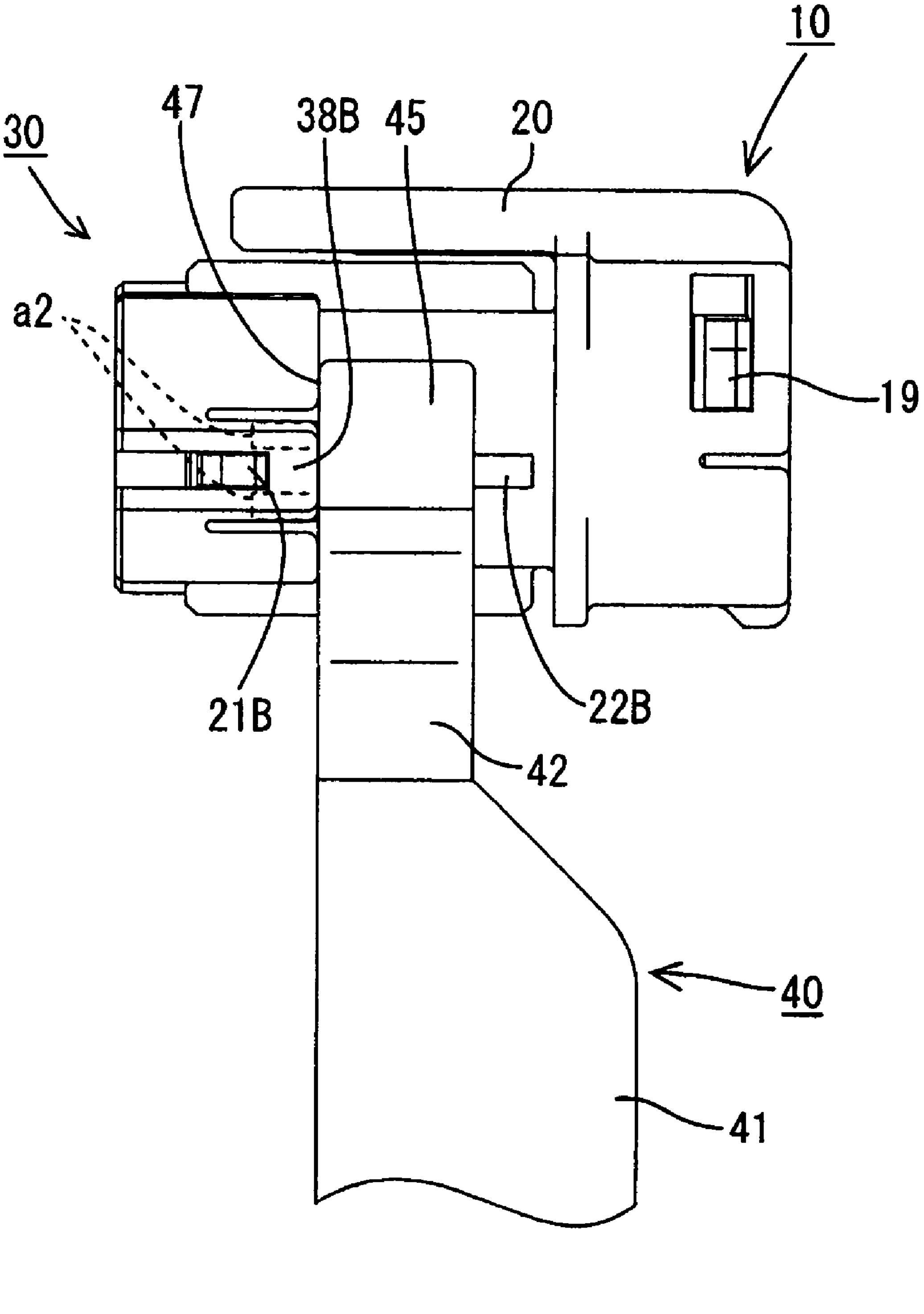
FIG. 9 is a side elevation showing a state in which a stopping portion of the unlocking jig is in contact with the holder.
Figure 10:
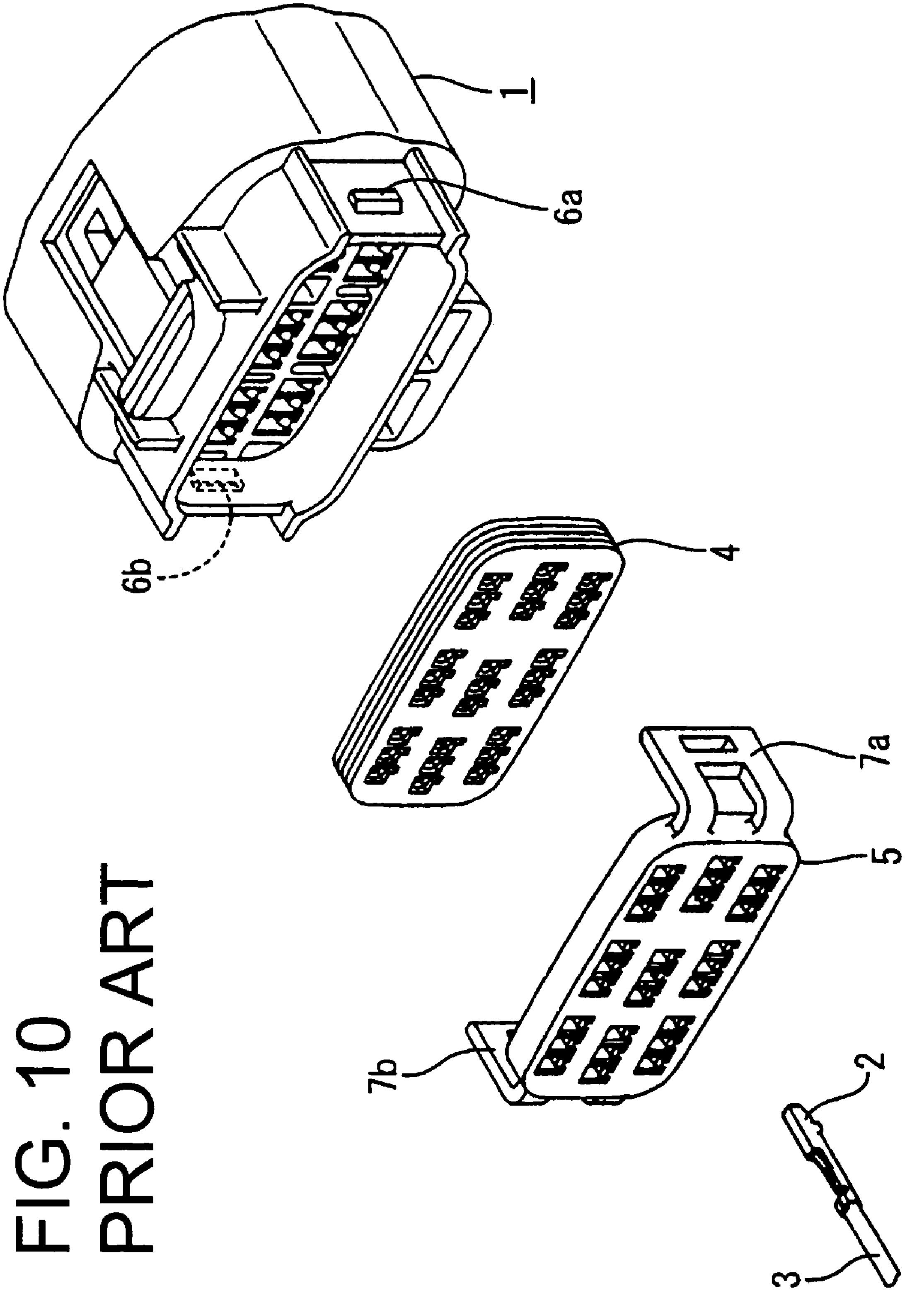
FIG. 10 PRIOR ART
FIG. 10 is an exploded perspective view showing a conventional art of mounting a member on a housing.

The short locking pieces 38B and 38C are deformed elastically to such an extent that they can be unlocked from the locking projections 21B and 21C respectively in performing the unlocking operation. Thus, a contact portion 47 of the unlocking jig 40 consisting of the front end surface of both arms 45 strikes against the open rear edge of the holder 30, as shown in FIG. 9. Accordingly, the unlocking jig 40 cannot move further forward toward the holder 30. That is, the contact portion 47 functions as a stopper for preventing excessive elastic deformation of the short locking pieces 38B and 38C.

The unlocking jig 40 unlocks the short locking pieces 38B and 38C simultaneously. However, the long locking piece 38A remains locked to the locking projection 21A. Thus, another unlocking jig (not shown) is used to unlock the long locking piece 38A from the locking projection 21A. In this case, the short locking pieces 38B and 38C are held in the unlocked state as described above. A pointed unlocking jig then is inserted into the gap of the frame-shaped locking arm 20 to unlock the long locking piece 38A from the locking projection 21A. The locking pieces 38A through 38C are on the four sides of the holder 30 to compress the sealing member 31 uniformly. Therefore the unlocking jig 40 is not capable of unlocking all the locking positions. However, if pressing of the sealing member 31 uniformly at four positions is not demanded, it is possible to lock the holder 30 at three positions. In this case, the unlocking jig 40 is capable of unlocking the three positions all together. Needless to say, the long locking piece 38A on the upper surface of the holder 40 may be unlocked before the unlocking jig 40 starts the unlocking operations.

As described above, in the embodiment, the unlocking claws a1 and a2 can unlock the three positions simultaneously merely by moving the unlocking jig 40 forward. Therefore unlike the conventional method of unlocking positions one by one, the unlocking method of the present invention can be carried out efficiently. The operation of moving unlocking jig 40 can be performed reliably because the operation of moving the unlocking jig 40 is guided by the guide grooves 43A and 43B. Thus a smooth unlocking operation can be accomplished.

The contact portion 47 prevents excessive deformation of the short locking pieces 38B and 38C and allows the holder 30 to be removed from the female housing 10 by moving the unlocking jig 40. Therefore, the holder 30 is unlocked and separated from the female housing 10 at the same time. The holder 30 cannot be removed from the female housing 10 unless the long locking piece 38A is unlocked from the locking projection 21A. Accordingly, a pressing force is applied to the holder 30 while the short locking pieces 38B and 38C are unlocked from the locking projections 21B and 21C. Thus, the holder 30 separates from the female housing 10 automatically when the long locking piece 38A is unlocked from the locking projection 21A.

The invention is not limited to the embodiment described above with reference to the drawings. For example, the following embodiments are included in the technical scope of the invention. Further, modifications of the embodiments can be made without departing from the spirit and scope of the invention.

The unlocking jig 40 is shown as being used where the locking projections 21A and 21B are formed on the female housing 10, and the locking pieces 38A through 38C (flexing pieces) are formed on the holder 30. However, the unlocking jig 40 may be used when the locking pieces 38A through 38C (flexing pieces) are on the female housing 10, and the locking projections 21A and 21B are on the holder 30.

The unlocking jig has been described for removing the holder 30 of the waterproof connector from the female housing. However, the unlocking jig is applicable to other members mounted on the housing.

The unlocking claws a1 and a2 of the unlocking jig 40 correspond to the symmetrical locking projections 21 on the female housing 10. However, the unlocking claws a1 and a2 may correspond to asymmetrical locking projections 21. The construction described in the embodiment allows the posture of the holder 30 to be maintained when the right and left ends of the holder 30 are pressed forward simultaneously. Therefore it is possible to prevent one of the right and left unlocked flexing pieces from being locked to the corresponding locking projection again, while an operation of unlocking the other flexing piece is being performed.

The unlocking claws a1 and a2 enter into each locking piece by moving the unlocking jig 40 in the front-to-back direction. However, the unlocking jig may be moved orthogonal to the front-to-back direction, the locking pieces are elastically deformed by the unlocking claws disposed forward in the direction in which the unlocking jig is moved.

What is claimed is:

1. An unlocking jig for removing a first part of a connector from a second part of the connector, the second part having two opposite side surfaces, a plurality of locks formed on the side surfaces, and the first part having a plurality of flexing pieces elastically locked respectively to the locks, said unlocking jig comprising:

an operation part and a substantially U-shaped unlocking part extending rigidly from an end of said operation part, the unlocking part having a base and two substantially parallel arms extending from the base so that the unlocking part defines a front face, a rear face opposite to the front face and a concave surface extending between the front and rear faces, the concave surface being configured for slidably engaging the side surfaces of the second part, a plurality of unlocking claws extending forward from the front face of the unlocking part, each unlocking claw having an inner surface aligned substantially perpendicular to the front face and an outer surface intersecting the inner surface at an acute angle forward of the front face, the unlocking claws being disposed and configured to engage the flexing pieces substantially simultaneously, such that movement of the operation part parallel to the inner surfaces of the unlocking claws urges the unlocking claws against the flexing pieces and deforms said flexing pieces substantially simultaneously in an unlocking direction.

2. The unlocking jig of claim 1, wherein a direction in which said first part is removed from said second part and a direction in which said unlocking jig is moved by operating said operation part are identical; and said unlocking part has a contact portion aligned for contacting said first part, with said unlocking claws deforming said flexing pieces and configured for pressing said first part from said second part in a removal direction when said unlocking jig is operated by said operation part.

3. The unlocking jig of claim 1, wherein said unlocking part has a to-be-guided portion extending substantially parallel to the unlocking claws and substantially perpendicular to the arms, the to-be-guided portion being disposed to fit on a guide portion formed on an outer side surface of said second part for sliding movement in a member-removal direction to allow said unlocking jig to be guided by operating said operation part.

4. The unlocking jig of claim 1, wherein the unlocking claws are formed on each of the arms.

5. The unlocking jig of claim 4, wherein the unlocking claws further include at least one unlocking claw formed on the base of the unlocking part.

6. The unlocking jig of claim 5, further comprising guide grooves formed substantially adjacent the respective unlocking claws for guiding movement of the unlocking jig relative to the second part.

7. An unlocking jig for removing a first part of a connector from a second part of the connector, the second part having two opposite side surfaces, a plurality of locks formed on the side surfaces, and the first part having a plurality of flexing pieces elastically locked respectively to the locks, said unlocking jig comprising:

an operation part and a substantially U-shaped unlocking part extending rigidly from the operation part, the U-shaped unlocking part having a front face and a rear face spaced apart along a moving direction of the unlocking part, a substantially concave surface extending between the front and rear faces and being substantially parallel to the moving direction, the concave surface being configured for slidably engaging the side surfaces of the second part, a plurality of unlocking claws extending forwardly from the front surface of the U-shaped unlocking part in the moving direction, each unlocking claw having an inwardly facing surface and an outwardly facing surface aligned to one another at an acute angle and meeting one another at position forward of the front face of the U-shaped unlocking part, whereby movement of the operation part substantially in the moving direction urges the unlocking claws against the flexing pieces and deforms said flexing pieces substantially simultaneously in an unlocking direction.

8. The unlocking jig of claim 7, wherein the inwardly facing surface of each unlocking claw is substantially parallel to the moving direction.

9. The unlocking jig of claim 8, wherein the inwardly facing surface of each unlocking claw is substantially coplanar with an adjacent part of the concave surface.

* * * * *